UNITED STATES PATENT OFFICE.

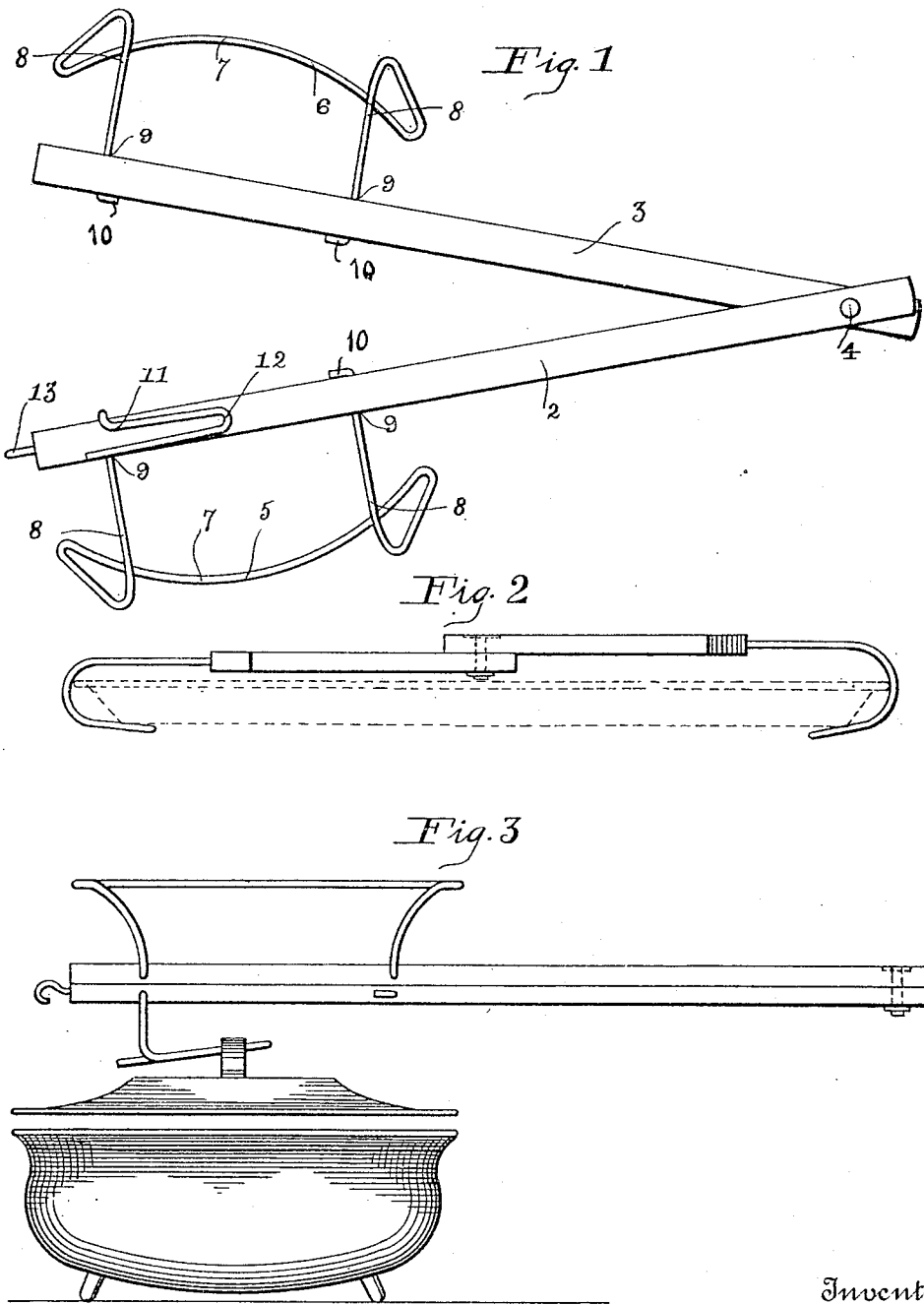

ELMER L. FISK, OF HALLSTEAD, PENNSYLVANIA.

POT OR PAN LIFTER.

No. 845,771.   Specification of Letters Patent.   Patented March 5, 1907.

Application filed April 12, 1906. Serial No. 311,354.

*To all whom it may concern:*

Be it known that I, ELMER L. FISK, a citizen of the United States, residing at Hallstead, in the county of Susquehanna and State of Pennsylvania, have invented certain new and useful Improvements in Pot or Pan Lifters; and I do declare the following to be a full, clear, and exact description of the invention, such as will enable others skilled in the art to which it appertains to make and use the same.

My invention relates to improvements in devices for readily lifting pots, pans, kettles, buckets, and the like and their covers or lids.

The object of the invention is to provide a simple, durable, and comparatively inexpensive device of this character which is convenient in use and well adapted for the purposes intended.

With the above and other objects in view the invention consists of certain novel features of construction, combination, and arrangement of parts, as will be hereinafter more fully described, and particularly pointed out in the appended claim.

In the accompanying drawings, Figure 1 is a plan view of my improved lifter in a partially-open position. Fig. 2 is an end view of the same, showing a pan between its jaws; and Fig. 3 is a side view of the device, in an inverted position, showing the manner in which it is used in removing lids from kettles, pots, and the like.

Referring to the drawings by numeral, 1 denotes my improved lifting device, which comprises a pair of hand-levers 2, pivotally connected together at 4 and carrying at their free ends opposing jaws 5 6, adapted to engage pots, pans, and the like. The hand-levers 2 3 are preferably in the form of rectangular strips or pieces of wood, and, as shown, the pivotal connection 4 is in the form of a rivet. Each of the jaws 5 6 is formed by a single piece of wire bent to form an arc-shaped gripping portion 7 and two curved arms 8, which support and space the portion 7 beneath and at the sides of the free ends of the levers 2 3 and which have their ends projecting through transverse openings 9 in said levers and bent at right angles, as shown at 10. One end of the outermost arm 8 of the jaw 5 is bent upwardly, as shown at 11, then forwardly, and then again rearwardly to form a longitudinally-projecting hook 12, adapted to enter the handle loops or eyes upon the tops of kettles, pots, pans, or the like, as clearly shown in Fig. 3. I also preferably provide in the outer or free end of the lever 2 a hook 13, which may be readily engaged with the handle-bail of a tin bucket or the like to permit it to be lifted and transported.

The construction, use, and advantages of the invention will be readily understood from the foregoing description, taken in connection with the accompanying drawings.

It will be seen that the hand-levers 2 3 may be spread apart, so that the curved portions 7 of the jaws 5 6 may be engaged with the rim of a pan or the top portion of a pot or the like to permit the same to be readily lifted and carried without danger of burning or soiling the hands. The provision of the hooks 12 13 also permits the tool to be used for lifting various articles, so that the device is exceedingly useful in the kitchen. It will be seen that it is simple and durable in construction and may be manufactured at comparatively small cost.

Having thus described my invention, what I claim as new, and desire to secure by Letters Patent, is—

The herein-described pot and pan lifter comprising the pair of pivotally-connected hand-levers, and the jaws attached to the free ends of the said levers, each of the said jaws being made from a single piece of wire bent to form the intermediate curved gripping portion, the reversely-bent portions at the ends of the gripping portion, and the supporting and spacing parallel arms at an angle to and extending from the inner ends of said reversely-bent portions and extending through openings in and attached to the hand-levers, the outer arm of one of said jaws being extended upwardly from said hand-lever and bent reversely to form a hook disposed parallel with the said hand-lever, for the purpose specified.

In testimony whereof I have hereunto set my hand in presence of two subscribing witnesses.

ELMER L. FISK.

Witnesses:
G. B. SMITH,
F. J. FISK.